UNITED STATES PATENT OFFICE.

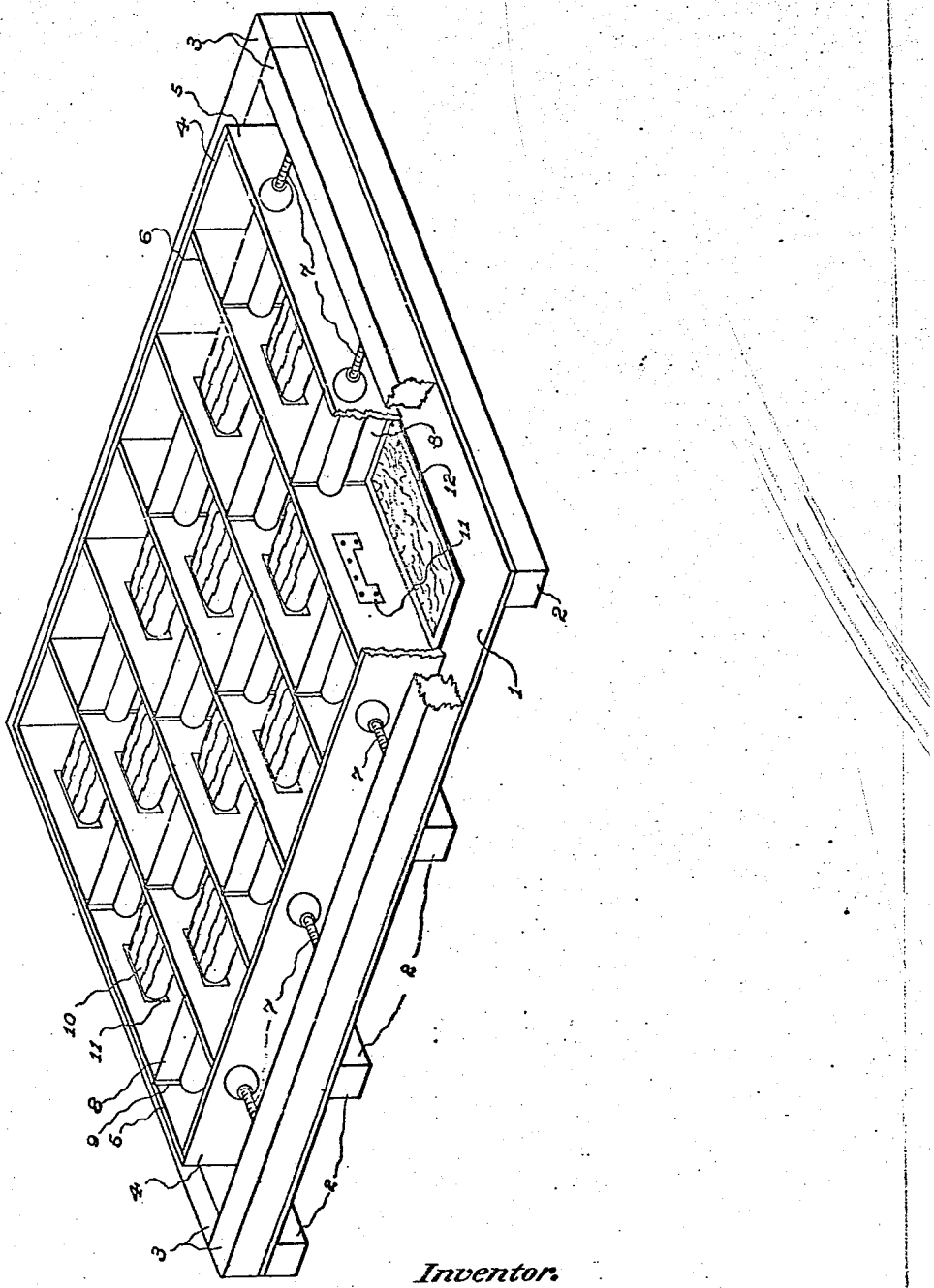

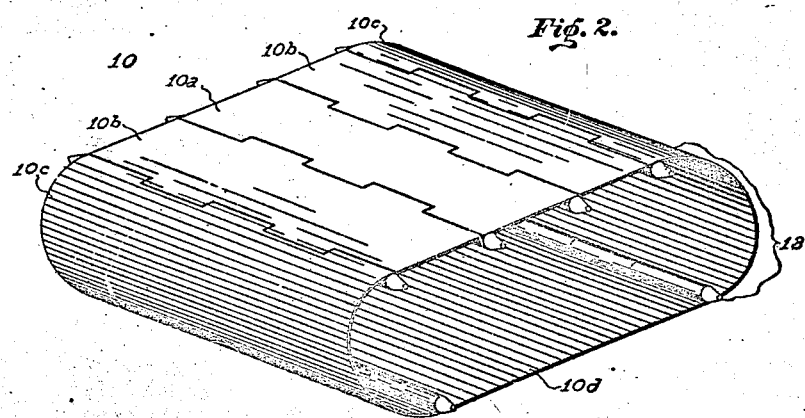
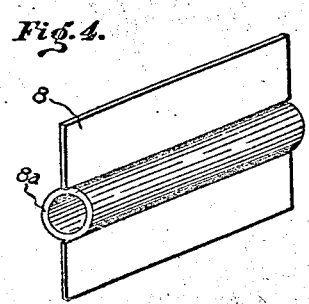
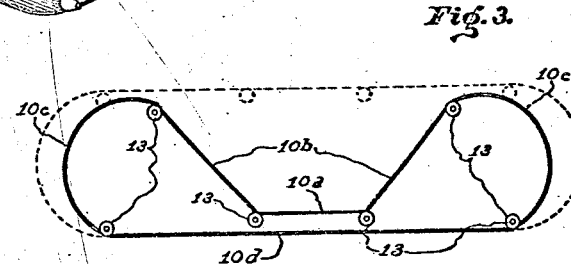
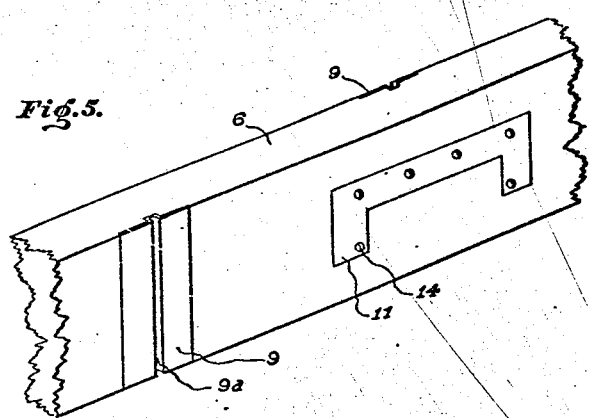

WILLIAM C. NEELEY, OF PUEBLO, COLORADO.

CONCRETE-MOLDING DEVICE.

No. 898,911.

Specification of Letters Patent.

Patented Sept. 15, 1908.

Application filed February 6, 1908. Serial No. 414,601.

*To all whom it may concern:*

Be it known that I, WILLIAM C. NEELEY, a citizen of Pueblo, Colorado, residing at Pueblo, in the county of Pueblo and State of Colorado, have invented certain new and useful Improvements in Concrete-Molding Devices; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.
My invention relates to concrete molding devices in which molds are formed collectively on a platform or floor by side and end partitions, arranged to form rectangular boxes that have secured, near their middles or centers, a collapsible core, and at their bottoms or tops, plates having designs thereon suitable to form the two faces of the blocks or forms being molded, all in such manner that any number of the molding boxes may be formed on a platform and be bound firmly together by jack-screws. And the objects of my invention are first, to provide a means for molding cement or other concrete mixtures into any desired form in molds, collectively arranged together so that a thoroughly saturated mixture may be used, and second to provide such collectively arranged molds in such manner that any number of such molds desired to be used, may be constructed by the use of duplicate parts of that which will form one mold; and third to provide such means, in such manner that a required number of molds may be set up to employ a required number of men for a desired time, to fill them, so that one-half the molds may stand a sufficient time to permit the molded cement therein, to harden sufficiently, that they may be handled without danger of breakage, while the other half of the molds, are being filled, all for the purpose of continuous operation. I attain these objects by the mechanisms illustrated in the accompanying drawings in which:

Figure 1 is a perspective view of my improvement, set up ready to be filled with cement mixture, one corner being in a partially broken section, to expose the inside of one of the boxes, and illustrates a small number of boxes, but the number shown illustrates but a small portion of the number that may be formed, by the same arrangement, or process—and Fig. 2: is a perspective view of the collapsible core used to form an opening through the molded concrete, and Fig. 3: is an end elevation of the collapsible core as it appears when collapsed, so that it may be removed from the surrounding cement; and Fig. 4: is a perspective view of the end partitions used to divide the boxes;
and Fig. 5: is a perspective view, in broken sections of a portion of one of the side partitions, showing metal plates mounted thereon, suitable to receive the ends of end partitions, Fig. 4, and the projecting parts of the core, Fig. 2.

Similar numbers refer to similar members, throughout the several views.

A floor plate 1, which may be of any length and width desired, is mounted on stringers 2, and to the floor plate are secured brace beams, 3 near its edges; side boards 4 and end boards 5 are placed inside the rectangle formed by beams 3, and within the inclosure formed by boards 4 and 5 side partitions 6, are placed with end partitions 8, Fig. 4 and cores 10, Fig. 2, between them in such manner that the partitions are spaced to form many boxes of a size, to form any desired cement brick, the core 10 being used when it is desired to form an opening in the brick. The partitions and cores being placed in position, the jack screws 7 are introduced between the beams 3 and side and end boards 4 and 5, Fig. 1, and firmly tightened against the sides, thus holding the assembled partitions securely in position, care being taken, that the lower edges of partitions, side and end boards, fit closely to the floor, so that the thoroughly saturated cement mixture, when placed in the boxes, will not escape.

To facilitate the proper spacing of end partitions 8 and cores 10, the end boards 5 and partitions 6 are provided with slotted metal partitions 9, Fig. 5, slotted at $9^a$ to receive the guides 9, Fig. 5, slotted at $9^a$ to receive the ends of partitions 8, the cylindrical portions $8^a$ of which serve to form concave indentures in the end of the brick, and plate 11 Fig. 5 having holes 14, which receive the extending portions 13, of core 10, Fig. 2, are set into the boards 5 and 6, to securely hold and space the cores 10. The collapsible core 10, Fig. 2, is composed of pieces of metal $10^a$, $10^b$, $10^c$ and $10^d$, all hinged together in such manner that when $10^a$ is pressed downward, as indicated in Fig. 3, the core is di minished in size, so that it may be easily removed, from the surrounding cement.

From the foregoing, it may be seen that any number of boxes containing cores 10, may be formed by the partition arrangement, in the bottoms of which, may be placed plates 12, having designs cast thereon, to form one side of a brick. These plates may be used at the top or bottom of the boxes as shown, or at both, top and bottom, so as to imprint a design on either or both sides of a brick. It may also be seen that plates 12 may be of any form of design to form a brick or to form a tile for roofing, side-walks, or floors. Partitions 8, Fig. 4 may be formed as shown, or as desired to form the ends of bricks, as desired.

The whole arrangement of collection mold containing boxes, may be assembled in such numbers that a given number of men may be employed continuously to fill them and take them down, removing the molded product in such manner that the concrete may have a given and sufficient time, undisturbed, to set and become hardened, though the mixture be thoroughly saturated to the desired consistency, thus making it practically, an easy matter to manufacture molded cement forms, that are thoroughly saturated and let them remain undisturbed until properly hardened, producing a very hard and compact, finished article at a minimum cost of labor and machinery.

I am aware that concrete molding devices have been made. I therefore, do not claim such a device too broadly but What I do claim and what I desire to secure by Letters Patent is, 1. In a concrete molding device the combination with a floor and brace beams of side partitions, with slotted plates that receive end partitions and with plates provided with holes to receive extended portions of a collapsible core, all operative, to be assembled collectively and be held securely and firmly by jack screws, substantially as shown.

2. In a concrete molding machine, brace beams, means for supporting the brace beams, side and end partitions, slotted plates on the side partitions to receive the ends of the end partitions, apertured plates on the side partitions, a collapsible core having extensions fitting in the apertures, and means for pressing the side plates into engagement with the end partitions and cores.

3. In a concrete molding device, partitions having apertured plates, a collapsible core comprising hinged sections having extensions fitted to the apertures of the plate and means for holding the partition and cores in assembled relation.

In testimony whereof, I affix my signature, in presence of two witnesses.

WILLIAM C. NEELEY.

Witnesses:
W. G. NEELEY,
A. H. CHAPMAN.